US008421959B2

(12) United States Patent
Yoon et al.

(10) Patent No.: US 8,421,959 B2
(45) Date of Patent: Apr. 16, 2013

(54) TRANSPARENT SEE-THROUGH DISPLAY DEVICE

(75) Inventors: Jun-Bo Yoon, Daejeon (KR); Won-Seok Choi, Daejeon (KR); Joo-Hyung Lee, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 425 days.

(21) Appl. No.: 12/388,928

(22) Filed: Feb. 19, 2009

(65) Prior Publication Data
US 2009/0290096 A1   Nov. 26, 2009

(30) Foreign Application Priority Data

May 20, 2008 (KR) .................. 10-2008-0046438

(51) Int. Cl.
G02F 1/295 (2006.01)
(52) U.S. Cl.
USPC .......................................... 349/65
(58) Field of Classification Search ............... 349/65
See application file for complete search history.

(56) References Cited

U.S. PATENT DOCUMENTS

| 6,481,581 | B2 * | 11/2002 | Sipe | 211/4 |
| 6,903,784 | B1 * | 6/2005 | Basturk | 349/2 |
| 8,212,744 | B2 * | 7/2012 | Kuo et al. | 345/8 |
| 2005/0248695 | A1 * | 11/2005 | Miyashita | 349/65 |
| 2006/0050198 | A1 * | 3/2006 | Kirita et al. | 349/61 |
| 2006/0092355 | A1 * | 5/2006 | Yang et al. | 349/114 |
| 2010/0277420 | A1 * | 11/2010 | Charlier et al. | 345/173 |

FOREIGN PATENT DOCUMENTS

| JP | 06043478 | 2/1994 |
| JP | 10299361 | 11/1998 |
| JP | 2001167625 | 6/2001 |
| JP | 2003322852 | 11/2003 |
| JP | 2004061565 | 2/2004 |
| KR | 1020010030542 | 4/2001 |

* cited by examiner

*Primary Examiner* — Eric Wong
(74) *Attorney, Agent, or Firm* — The Belles Group, P.C.

(57) ABSTRACT

There is provided a see-through display device. A see-through display device comprises a liquid crystal plate filled with liquid crystals; first and second orientation plates respectively positioned on upper and lower surfaces of the liquid crystal plate, and controlling an initial alignment state of the liquid crystals; first and second conductive plates respectively positioned on an upper surface of the first orientation plate and a lower surface of the second orientation plate, and being filled with a conductive material; first and second transparent plates respectively positioned on an upper surface of the first conductive plate and a lower surface of the second conductive plate; first and second polarizing plates respectively positioned on an upper surface of the first transparent plate and a lower surface of the second transparent plate; and a transparent light guide plate spaced apart from a lower surface of the second polarizing plate, and allowing beams incident from a light source positioned at one side thereof to be totally reflected and emitted upward. Accordingly, a see-through display device comprises a transparent optical display device and a transparent light guide plate having a light source disposed at one side thereof, so that the display device can be optically transparent even when it is not operated.

21 Claims, 11 Drawing Sheets

TRANSPARENT SEE-THROUGH DISPLAY DEVICE

CROSS-REFERENCE TO RELATED APPLICATION

This application claims priority to Korean Patent Application No. 10-2008-0046438, filed on May 20, 2008, and all the benefits accruing therefrom under 35 U.S.C. §119, the contents of which in its entirety are herein incorporated by reference.

BACKGROUND OF THE INVENTION

1. Field of the Invention

This disclosure relates to a transparent see-through display device, and more particularly, to a device capable of displaying images by allowing background radiation and beams incident to the display device to be exclusively or simultaneously transmitted or blocked.

2. Description of the Related Art

Display devices through which various types of information such as images and characters are visually displayed to human beings have come into the highlight as a core sector in information and communication industries.

In the future, it is expected that displays will require not only conventional ultra-thin, high-resolution and light characteristics but also transparent and flexible characteristics. Particularly, when transparent displays are applied to televisions, monitors, vehicular displays, head-up displays (HUDs) and the like, the ripple effect is enormous. Accordingly, attentions have recently been paid to the transparent displays.

Here, the transparent displays may be used for electronic products, transportation, industry, military and the like. Particularly, when the transparent displays are applied to vehicular windshields, information may be visually displayed through the transparent displays, and electronic devices may be applied to any types of glass, thereby improving security systems and the like. Further, dashboards and navigators may be easily built in vehicular windshields, and glass for aquaria or show windows may be used as displays. When the transparent displays are applied to military fields, they may be applied to goggles for military, through which targets and instructions in front of soldiers are displayed, and the like.

However, it is difficult to implement the transparent displays using current display technologies. A liquid crystal display (LCD) is used to display a specific image by changing arrangement of liquid crystal molecules when beams are supplied to the LCD and radiated to the outside of the LCD. The LCD have been sufficiently developed because current manufacturing techniques are stabilized, large-sized displays are implemented, reliability is secured as commercial displays, and the like.

However, it is difficult to implement transparent displays because of main components such as a back light apparatus and a color filter.

Here, the back light apparatus is divided into a direct light type and a light guide type. The direct light type is a type in which a light source is disposed beneath a light emission surface to have an optical distribution of a surface light source. In the direct light type, several light sources are disposed, thereby improving luminance and broadening a light emitting surface as compared with in the light guide type. However, the surface light emitting source is a problem in implementing a transparent display. On the other hand, the light guide type is a type in which a light guide plate is used to guide beams toward a light emission surface, and a light source is disposed at a side of the light guide plate. In the light guide type, optical patterns are formed to allow luminance to be uniformly distributed on the entire light emitting surface. However, when a diffusion sheet is formed on the light guide plite, the optical patterns cause distortion of transmitted beams, and therefore, it is difficult to implement a transparent display. Since the diffusion sheet diffuses beams, transparency of the light guide plate is considerably lowered. Therefore, the diffusion sheet is a primary factor in blocking implementation of a transparent display.

Further, a color filter of the LCD has a transmittance of 25% or less, and its efficiency is low. For this reason, it is difficult to ensure transparency. The color filter is formed using methods including electrodeposition, printing, dyeing (dyeing of photopolymer patterns), pigment dispersion (photolithography using photopolymer in which pigments are dispersed), and the like. However, the electrodeposition has a critical problem in uniformly arranging pixels and manufacturing large-sized substrates due to inequality of the shape around an electrode. The dyeing is hardly used because it is difficult to align liquid crystal cells at precise positions, it is inaccurate to form patterns, and it is unsuitable for the formation of thin films, the improvement of resolution and the formation of large-sized substrates. While the dyeing has characteristics of precision (high resolution) of pattern formation, high light transmittance, high color purity and the like, the dying has problems of low thermal resistance, low light resistance and low chemical resistance, caused by discoloration or evaporation of the color of a pigment. The pigment dispersion is most suitable out of the aforementioned methods because it does not have such problems. Accordingly, the pigment dispersion has recently been frequently used in manufacturing color filters. However, most beams emitted from a back light are absorbed or reflected by a color filter formed using the pigment dispersion. Therefore, the color filter is a main cause of low optical efficiency and an obstacle in implementing transparent displays.

SUMMARY

This disclosure provides a see-through display device which allows a display device to be optically transmitted, so that background positioned at the rear of the display device can be observed at the front of the display device in an off state of the display device, and background positioned at the rear of the display device and an image expressed of an image monitor is formed simultaneously by completely blocking the background or by blocking only a portion at which an image is expressed and allowing the background to be transmitted into other portions in an operating state or mode of the display device, thereby obtaining the effect that an image is expressed in space.

This disclosure also provides a see-through display device which can express images of an image monitor in space without problems of image distortion generated by a projector, complexity required in optical systems having long focal length and illumination systems having high luminance, ghost, and the like.

This disclosure also provides a see-through display device which can save energy and have a thin thickness as compared with a conventional image display device by simultaneously or selectively using natural light or a light source.

This disclosure also provides a see-through display device which can allow images to be recognized using a light source and allow background positioned at the rear of the display device to be still transmitted to the front of the display device in an operation mode of the light source, even when it is difficult to clearly observe images expressed in an image display device due to the low luminance level in time and space where natural light is not received.

In one aspect, there is provided a see-through display device comprising a liquid crystal plate filled with liquid crystals; first and second orientation plates respectively positioned on upper and lower surfaces of the liquid crystal plate, and controlling an initial alignment state of the liquid crystals; first and second conductive plates respectively positioned on an upper surface of the first orientation plate and a lower surface of the second orientation plate, and being filled with a conductive material; first and second transparent plates respectively positioned on an upper surface of the first conductive plate and a lower surface of the second conductive plate; first and second polarizing plates respectively positioned on an upper surface of the first transparent plate and a lower surface of the second transparent plate; and a transparent light guide plate spaced apart from a lower surface of the second polarizing plate, and allowing beams incident from one side thereof to be totally reflected and emitted upward.

In another aspect, there is provided a see-through display device comprising a liquid crystal plate filled with liquid crystals; first and second orientation plates respectively positioned on upper and lower surfaces of the liquid crystal plate, and controlling an initial alignment state of the liquid crystals; first and second conductive plates respectively positioned on an upper surface of the first orientation plate and a lower surface of the second orientation plate, and being filled with a conductive material; first and second transparent plates respectively positioned on an upper surface of the first conductive plate and a lower surface of the second conductive plate; first and second polarizing plates respectively positioned on an upper surface of the first transparent plate and a lower surface of the second transparent plate; and a transparent light guide plate spaced apart from an upper surface of the first polarizing plate, and allowing beams incident from one side thereof to be totally reflected and emitted downward.

The polarizing axis of the first polarizing plate may be formed perpendicular to that of the second polarizing plate.

The first and second polarizing plates may be dichroic polarizing plates including iodine or pigmentation-oriented polyvinyl alcohol.

The first and second transparent plates may be made of glass or plastic.

The liquid crystal plate may be a twisted nematic (TN) type display in which liquid crystal molecules are twisted by about 80 to 90 degrees or a film compensated super twisted nematic (FSTN) type display in which liquid crystal molecules are twisted by about 180 to 270 degrees, and an optical compensation film is added to the film compensated super twisted nematic (FSTN).

Each of the first and second conductive plates may comprises a thin addressable electrode matrix.

The light guide plate may comprise a light path changing means allowing beams incident from the side of the light guide plate to be refracted and advanced toward the second polarizing plate.

The light path changing means may comprise a plurality of patterns formed on an upper or lower surface of the light guide plate so that beams are refracted and then emitted toward the second polarizing plate.

The plurality of patterns may be sparsely spaced apart from one another to minimize refraction of beams which are incident to the lower surface of the light guide plate, transmitted into the light guide plate and then emitted to the upper surface of the light guide plate.

The light guide plate may be formed of a transparent optical material including at least one of polymethyl methacrylate (PMMA), polycarbonate (PC) and polydimethylsiloxane (PDMS).

The light source may be positioned at one side of the transparent light guide, wherein the light source is a combination of a cold cathode fluorescent lamp (CCFL) and a reflective body, or a light emitting diode (LED).

The polarizing axis of the first polarizing plate may be formed parallel with a polarizing axis of the second polarizing plate.

The second polarizing plate may allow beams having a polarizing state perpendicular to a stretch direction thereof to be transmitted and allow beams having a polarizing state parallel with the stretch direction thereof to be reflected.

The light guide plate may comprise a light path changing means allowing beams incident from the side of the light guide plate to be refracted and advanced toward the first polarizing plate.

The plurality of patterns may be sparsely spaced apart from one another to minimize refraction of beams which are incident to the upper surface of the light guide plate, transmitted into the light guide plate and then emitted to the lower surface of the light guide plate.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Hereinafter, a transmissive see-through display device according to a first embodiment will be described with reference to the accompanying drawings.

Figure 1:
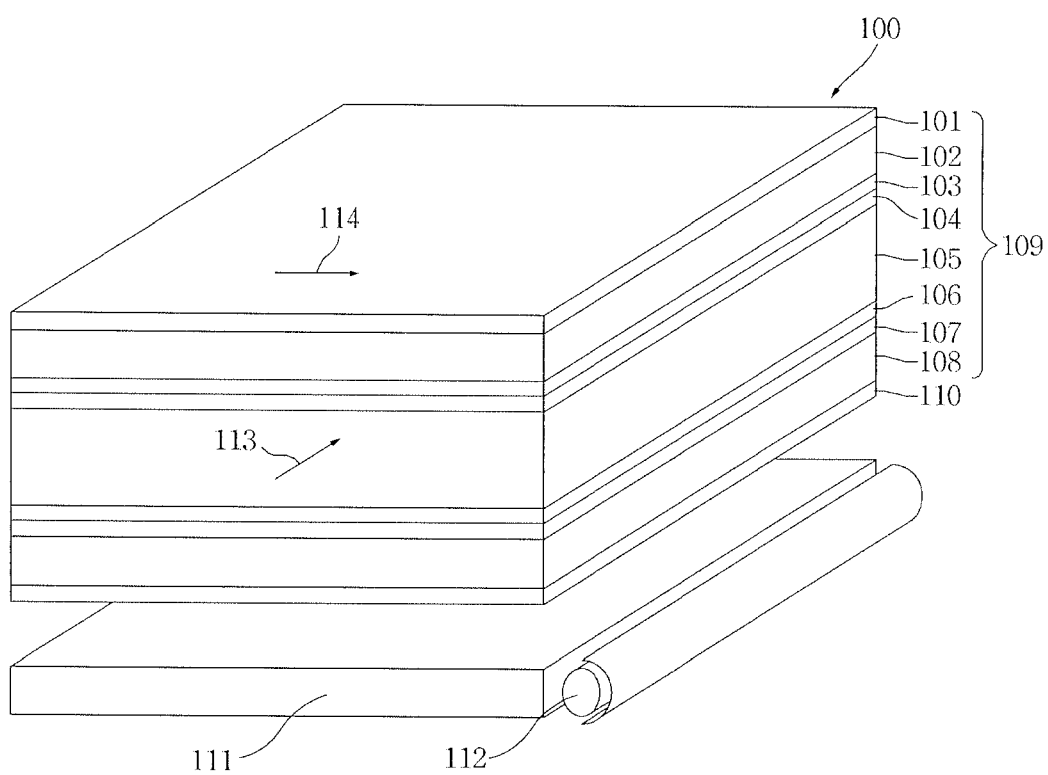
FIG. 1 is a cross-sectional perspective view illustrating the structure of a transmissive see-through display device according to a first embodiment.
Figure 2:
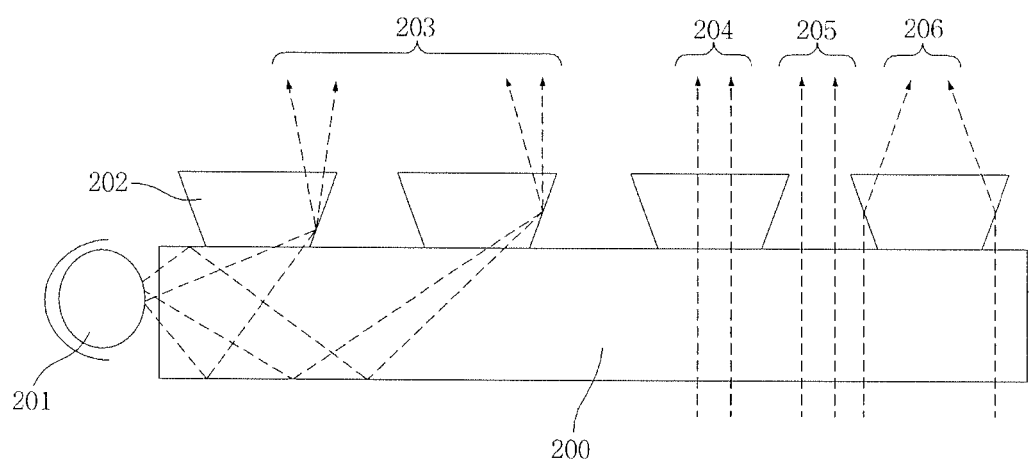
FIG. 2 is a view illustrating an embodiment of the structure of a transparent light guide plate in the see-through display device.
Figure 3:
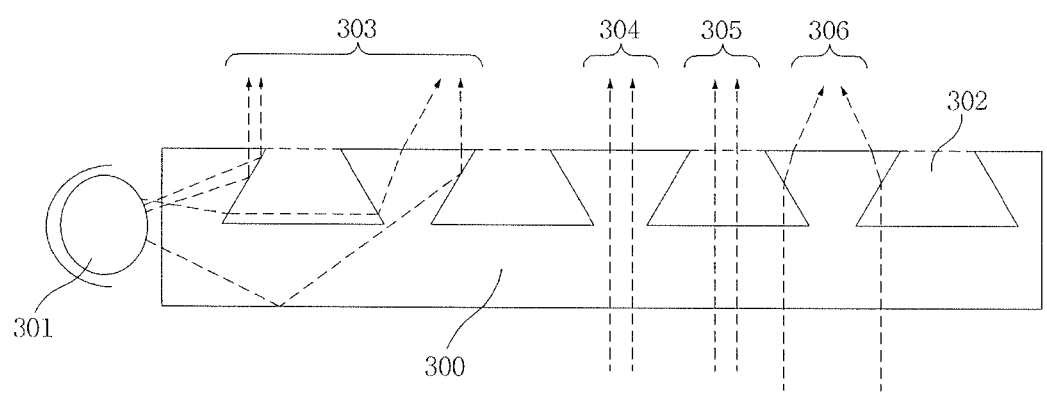
FIG. 3 is a view illustrating another embodiment of the structure of a transparent light guide plate in the see-through display device.
Figure 4:
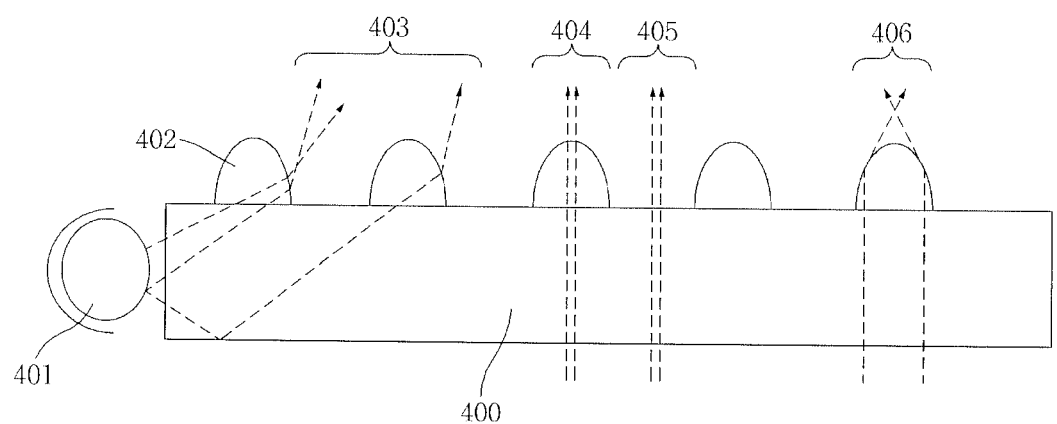
FIG. 4 is a view illustrating still another embodiment of the structure of a transparent light guide plate in the see-through display device.
Figure 5:
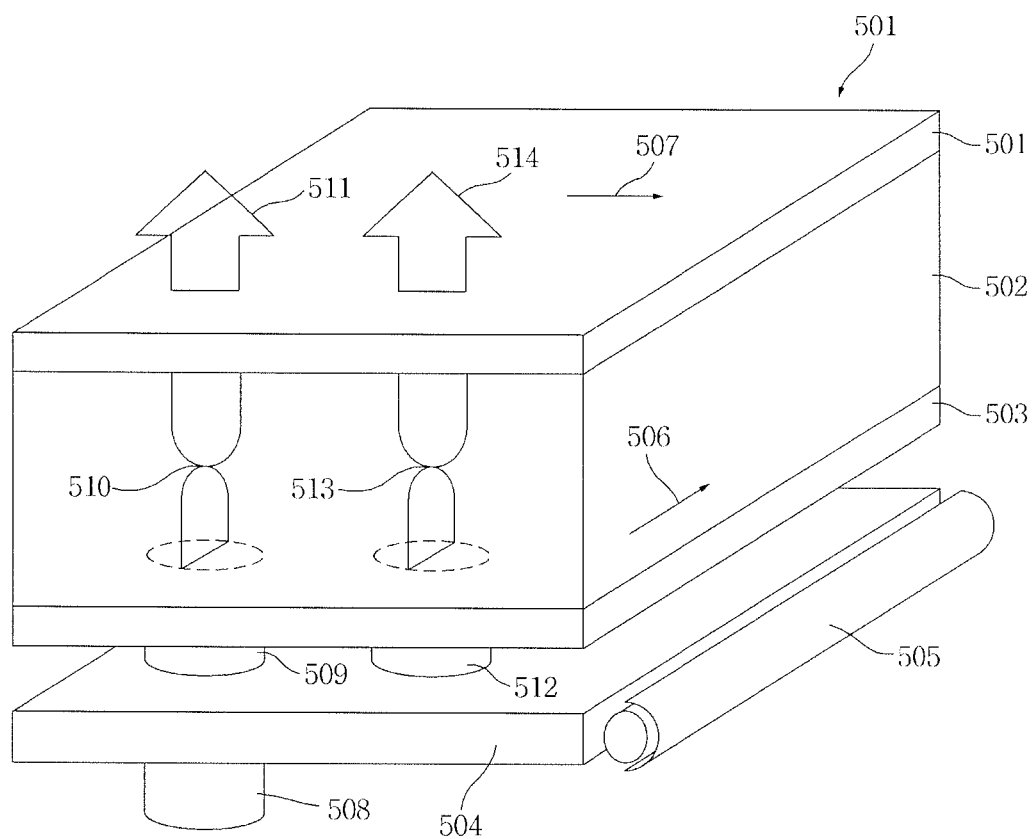
FIG. 5 is a view illustrating the operation when a see-through display device is in a transmitting state according to the first embodiment.
Figure 6:
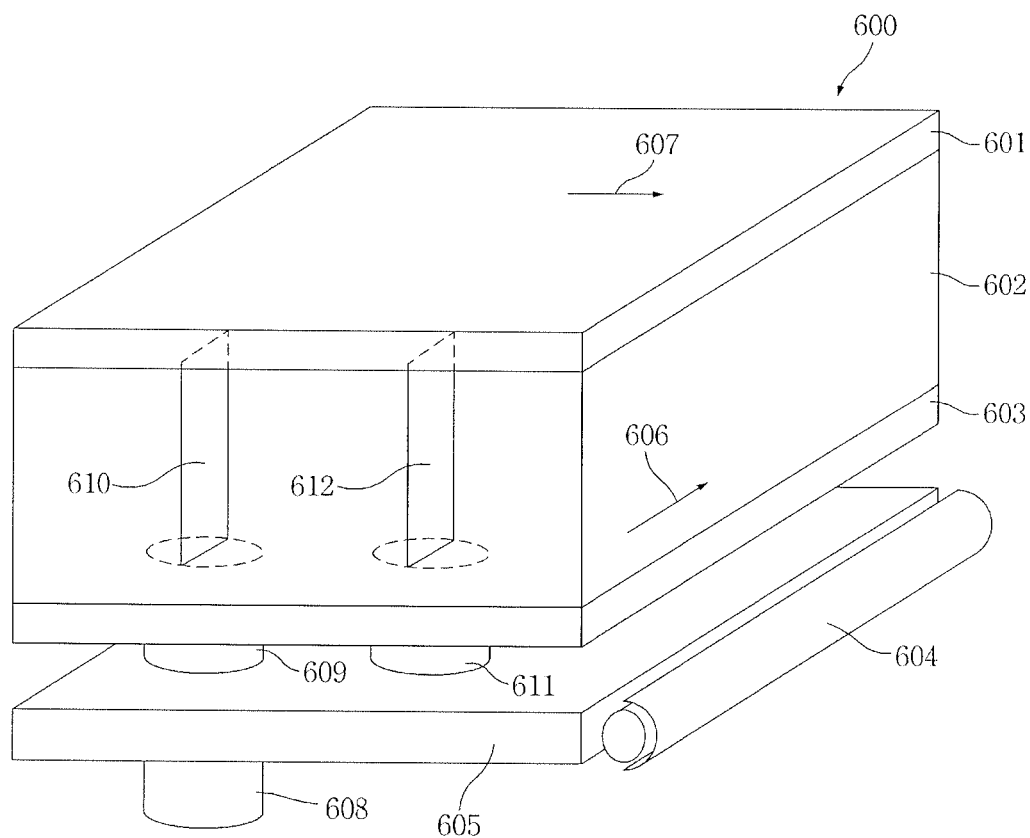
FIG. 6 is a view illustrating the operation when a see-through display device is in a blocking state according to the first embodiment.
Figure 7:
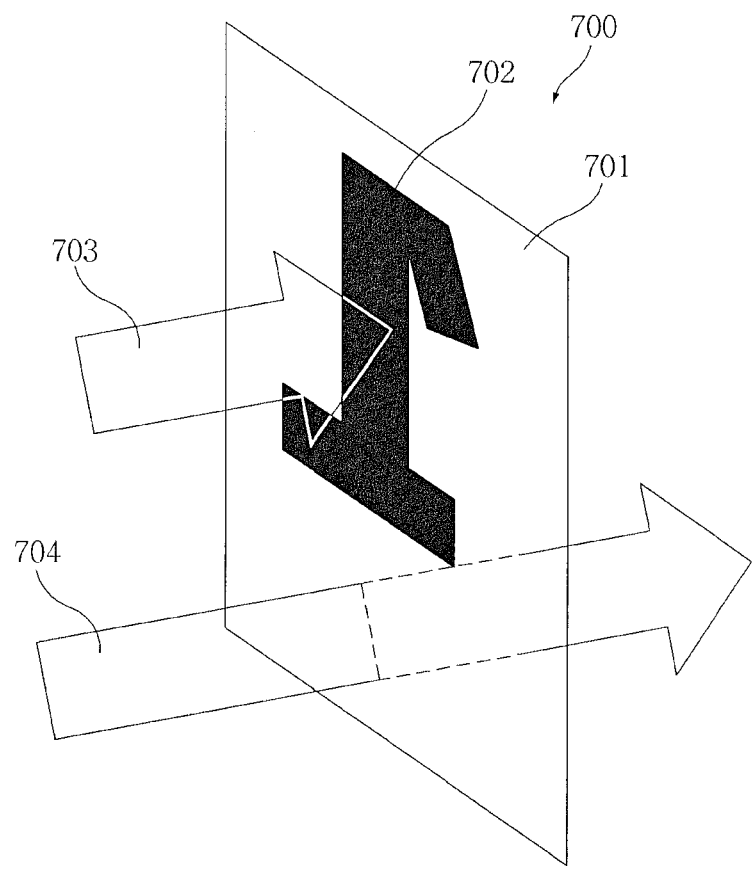
FIG. 7 is a view illustrating an embodiment of the display state of a pixelated transmissive see-through display device.
Figure 8:
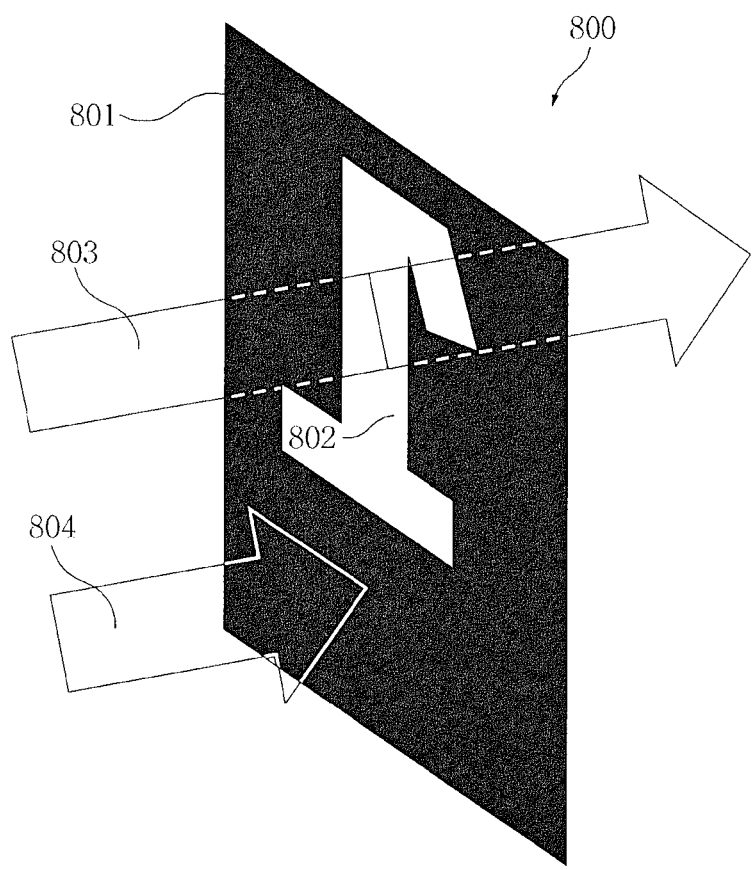
FIG. 8 is a view illustrating another embodiment of the display state of a pixelated transmissive see-through display device.

FIG. 1 is a cross-sectional perspective view illustrating the structure of a transmissive see-through display device according to a first embodiment. FIG. 2 is a view illustrating an embodiment of the structure of a transparent light guide plate in the see-through display device. FIG. 3 is a view illustrating another embodiment of the structure of a transparent light guide plate in the see-through display device. FIG. 4 is a view illustrating still another embodiment of the structure of a transparent light guide plate in the see-through display device. FIG. 5 is a view illustrating an embodiment of the operation when a see-through display device is in a transmitting state. FIG. 6 is a view illustrating an embodiment of the operation when a see-through display device is in a blocking state. FIG. 7 is a view illustrating an embodiment of the display state of a pixelated transmissive see-through display device. FIG. 8 is a view illustrating another embodiment of the display state of a pixeled transmissive see-through display device.

FIG. 1 is a cross-sectional perspective view illustrating the structure of a transmissive see-through display device according to a first embodiment.

As illustrated in FIG. 1, the transmissive see-through display device 100 comprises a transparent optical display device 109. The transparent optical display device 109 comprises a pair of first and second transparent plates 102 and 108, which are disposed while being spaced apart from each other at a predetermined distance.

Transparent conductive plates 103 and 107 are respectively positioned on inner surfaces of the first and second transparent plates 102 and 108. The transparent first and second conductive plates 103 and 107 are used to apply a voltage to liquid crystals 105 interposed therebetween, and may be connected to a panel converting device (not shown) provided at the outside of the display device. The transparent first and second conductive plates 103 and 107 may be made of glass or plastic having optical transparency and low birefringence. For pixelation of the display device, each of the transparent first and second conductive plates 103 and 107 may comprise a thin addressable electrode matrix. Twist of the liquid crystals 105 interposed between the transparent first and second conductive plates 103 and 107 may be controlled by the panel converting device provided at the outside of the display device, thereby controlling brightness.

First and second orientation plates 104 and 106 are respectively positioned on inner surfaces of the transparent first and second conductive plates 103 and 107. The first and second orientation plates 104 and 106 determine an initial alignment state of the liquid crystals interposed therebetween. Accordingly, in the alignment state of the liquid crystals 105, an upper portion in contact with the first orientation plate 104 and a lower portion in contact with the second orientation plate 106 are aligned in directions of first and second arrows 114 and 113, respectively. The liquid crystals 105 may be a twisted nematic (TN) type display or a film compensated super twisted nematic (FSTN) type display. In the TN type display, liquid crystal molecules are twisted by about 80 to 90 degrees when an electric field is not applied thereto. In the FSTN type display, liquid crystal molecules are twisted by about 180 to 270 degrees, and an optical compensation film is added to a STN type display.

Here, the TN type is a type in which liquid crystal molecules interposed between upper and lower substrates are twisted by about 80 to 90 degrees. However, since liquid crystal molecules are oriented to be twisted by about 180 to 270 degrees, a STN type display uses transmittance of beams changed rapidly in the FSTN type display, an optical compensation film is added to the STN type display to compensate for a defect of the STN type display, which on/off display colors are yellowish green and dark blue. Accordingly, white and black can be expressed.

First and second polarizing plates 101 and 110 are respectively positioned oil outer surfaces of the transparent optical display device 109. The first and second polarizing plates 101 and 110 polarize unpolarized beams incident from the outside so as to pass only components of the beams parallel with the polarizing axes of the first and second polarizing plates 101 and 110 and to absorb components of the beams perpendicular to the polarizing axes of the first and second polarizing plates 101 and 110. The polarizing axes of first and second polarizing plates 101 and 110 are respectively arranged in directions of the first and second arrows 114 and 113 which are arranged perpendicular to each other. Here, the first and second polarizing plates 101 and 110 may be dichroic polarizing plates including iodine or pigmentation-oriented polyvinyl alcohol.

A transparent light guide plate 111 is positioned below the second polarizing plate 110, and a light source 112 is positioned at one side of the light guide plate 111. Beams emitted from the light source 112 are incident to the light guide plate 111, refracted at an angle approximate to verticality by a plurality of patterns (not shown) formed on the light guide plate 111, and then incident to the transparent optical display device 109.

Here, the light guide plate 111 may be formed of a transparent optical material. More specifically, the light guide plate 111 may be formed of a transparent optical material including at least one of polymethyl methacrylate (PMMA), polycarbonate (PC) and polydimethylsiloxanie (PDMS), which are polymer resins and have high transparency, high durability and the like.

FIG. 2 is a view illustrating an embodiment of the structure of a transparent light guide plate in the see-through display device.

As illustrated in FIG. 2, a light source 201 is disposed at one side of the transparent light guide plate 200, and a plurality of transparent patterns 202 are formed on the front of the light guide plate 200. Beams emitted from the light source 201 become beams 203 which are totally reflected inside the light guide plate 200 and then refracted with all angle approximate to verticality through the patterns 202. Background beams incident from the rear of the light guide plate 200 become beams 204 which are transmitted into the light guide plate 200 and then vertically transmitted through a flat upper surface of each of the patterns 202, beams 205 which are vertically transmitted through portions having no pattern of the light guide plate 200, or beams 206 which are refracted through an edge of each of the patterns 202 and diagonally transmitted. The refracted beams 206 result in distortion of the background beams. Accordingly, the patterns 202 are sparsely spaced apart from one another, thereby reducing the distortion of the background beams.

FIG. 3 is a view illustrating another embodiment of the structure of a transparent light guide plate in the see-through display device.

As illustrated in FIG. 3, a light source 301 is disposed at one side of the transparent light guide plate 300, and a plurality of recessed patterns 302 are formed in the front of the light guide plate 300. Beams emitted from the light source 301 become beams 303 which are totally reflected inside the light guide plate 300 and then refracted with an angle approximate to verticality through the recessed patterns 302. Background beams incident from the rear of the light guide plate 300 become beams 305 which are vertically transmitted through a flat surface of each of the recessed patterns 302, beams 304 which are vertically transmitted through portions having no pattern of the light guide plate 300, or beams 306 which are refracted through an edge of each of the patterns 302 and diagonally transmitted. The refracted beams 306 result in distortion of the background beams. Accordingly, the recessed patterns 302 are sparsely spaced apart from one another, thereby reducing the distortion of the background beams.

FIG. 4 is a view illustrating still another embodiment of the structure of a transparent light guide plate in the see-through display device.

As illustrated in FIG. 4, a light source 401 is disposed at one side of the transparent light guide plate 400, and a plurality of transparent patterns 402 are formed in the front of the light guide plate 400. Beams emitted from the light source 401 become beams 403 which are totally reflected inside the light guide plate 400 and then refracted with an angle approximate to verticality through the patterns 402. Background beams incident from the rear of the light guide plate 300 become beams 404 which are transmitted into the light guide plate 400 and then vertically transmitted through a flat upper surface of each of the patterns 402, beams 405 which are vertically transmitted through portions having no pattern of the light guide plate 400, or beams 406 which are refracted through an edge of each of the patterns 402 and diagonally transmitted. The refracted beams 406 result in distortion of the background beams. Accordingly, the patterns 402 are sparsely spaced apart from one another, thereby reducing the distortion of the background beams.

FIG. 5 is a view illustrating an embodiment of the operation when a see-through display device is in a transmitting state.

As illustrated in FIG. 5, when the display device 500 is in a transmitting state, background beams 508 incident from the rear of the display device 500 are unpolarized beams. After the background beams 508 pass through a transparent light guide plate 504, they are still maintained as unpolarized beams 509. While the beams 509 passing through the light guide plate 504 are transmitted into a second polarizing plate 503, only components of the beams 509 parallel with a polarizing axis 506 are transmitted into the second polarizing plate 503, and components of the beams 509 perpendicular to the polarizing axis 506 are absorbed by the second polarizing plate 503. Meanwhile, liquid crystal plate 502 may be of a TN type display or an FSTN type display. In the TN type display, liquid crystal molecules are twisted by about 80 to 90 degrees. In the FSTN type display, liquid crystal molecules are twisted by about 180 to 270 degrees, and an optical compensation film is added to the STN type display. The optical compensation film is prepared by uniaxially stretching a polymer film to have a specific phase difference.

At this time, an electric field is not applied to the liquid crystals 502, and the liquid crystals 502 are twisted by about 90 degrees in an initial alignment state.

Accordingly, the polarizing direction of beams 510 advancing inside the liquid crystals 502 is changed into 90 degrees. When the beams 510 are transmitted into a first polarizing plate 501, polarized components of the beams 510 have the same direction as that of a polarizing axis 507 of the first polarizing plate 501. For this reason, the beams 510 become beams 511 which are transmitted without absorption and then emitted to the front of the display device 500.

Beams (not shown) emitted from a light source 505 disposed at one side of the light guide plate 504 become unpolarized beams 512 which are incident to the light guide plate 504, refracted at an angle approximate to verticality with respect to the light guide plate 504 and then incident to the second polarizing plate 503. While the beams 512 are transmitted into the second polarizing plate 503, only components of the beams 512 parallel with the polarizing axis 506 are transmitted into the second polarizing plate 506, and components of the beams 512 perpendicular to the polarizing axis 506 are absorbed by the second polarizing plate 503. The polarizing direction of beams 513 advancing inside the liquid crystals 502 is changed into about 90 degrees. When the beams 513 are transmitted into the first polarizing plate 501, polarized components of the beams 513 have the same direction as that of the polarizing axis 507 of the first polarizing plate 501. For this reason, the beams 513 become beams 514 which are transmitted without absorption and then emitted to the front of the display device 500.

FIG. 6 is a view illustrating an embodiment of the operation when a see-through display device is in a blocking state.

As illustrated in FIG. 6, when the display device 600 is in a blocking state, background beams 608 incident from the rear of the display device 600 are unpolarized beams. After the background beams 608 pass through a transparent light guide plate 605, they are still maintained as unpolarized beams 609. While the beams 609 passing through the light guide plate 605 are transmitted into a second polarizing plate 603, only components of the beams 609 parallel with a polarizing axis 606 are transmitted into the second polarizing plate 603, and components of the beams 609 perpendicular to the polarizing axis 606 are absorbed by the second polarizing plate 603. At this time, an electric field is applied to liquid crystals 602, and the liquid crystals 602 are untwisted from the initial alignment state in which the liquid crystals 602 are twisted by about 90 degrees. Accordingly, the polarizing direction of beams 610 advancing inside the liquid crystals 602 is maintained. When the beams 610 are transmitted into a first polarizing plate 601, polarized components of the beams 610 are perpendicular to a polarizing axis 607 of the first polarizing plate 601. For this reason, all the polarized components of the beams 610 are absorbed by the first polarizing plate 601, and there is no beam emitted to the front of the display device 600.

Beams (not shown) emitted from a light source 604 disposed at one side of the light guide plate 605 become unpolarized beams 611 which are incident to the light guide plate 605, refracted at an angle approximate to verticality with respect to the light guide plate 605 and then incident to the second polarizing plate 603. While the beams 611 are transmitted into the second polarizing plate 603, only components of the beams 611 parallel with the polarizing axis 606 are transmitted into the second polarizing plate 606, and components of the beams 611 perpendicular to the polarizing axis 606 are absorbed by the second polarizing plate 603. The polarizing direction of beams 612 advancing inside the liquid crystals 602 is maintained. When the beams 612 are transmitted into the first polarizing plate 601, polarized components of the beams 612 are perpendicular to the polarizing axis 607 of the first polarizing plate 601. For this reason, all the polarized components of the beams 612 are absorbed by the first polarizing plate 601, and there is no beam emitted to the front of the display device 600.

FIG. 7 is a view illustrating an embodiment of the display state of a pixelated transmissive see-through display device.

As illustrated in FIG. 7, when the pixelated transmissive see-through display device 700 is in a display state, the display device 700 is divided into pixels 701 in a transmitting state and blocking pixels 702 in a blocking state using voltage addressing performed by first and second conductive plates. Since the pixels 701 in the transmitting state allow incident beams to be transmitted, beams 704 pass through the display device 700 and reach user's eyes. Since the pixels 702 in the blocking state allow incident beams to be blocked, beams 703 are absorbed into the display device 700 and do not reach the user's eyes. Accordingly, the user observes number "1" expressed by the pixels 702 in the blocking state while seeing bright beams emitted by a light source (not shown) of a transparent light guide plate and rear background through the pixels 701 in the transmitting state.

FIG. 8 is a view illustrating another embodiment of the display state of a pixelated transmissive see-through display device.

As illustrated in FIG. 8, when the pixelated transmissive see-through display device 800 is in a display state, the display device 800 is divided into pixels 802 in a transmitting state and blocking pixels 801 in a blocking state using voltage addressing performed by first and second conductive plates. Since the pixels 802 in the transmitting state allow incident beams to be transmitted, beams 803 pass through the display device 800 and reach user's eyes. Since the pixels 801 in the blocking state allow incident beams to be blocked, beams 804 are absorbed into the display device 800 and do not reach the user's eyes. Accordingly, the user observes black background expressed by the pixels 801 in the blocking state, and bright beams emitted by a light source (not shown) of a transparent light guide plate, and number "1" expressed by the pixels 802 in the transmitting state, through which rear background is transmitted.

Meanwhile, each of the first and second conductive plates has a thin addressable electrode matrix formed on an inner surface of each of the first and second conductive plates so as to implement pixels of a liquid crystal plate.

Hereinafter, a transmissive see-through display device according to a second embodiment will be described with reference to the accompanying drawings.

Figure 9:
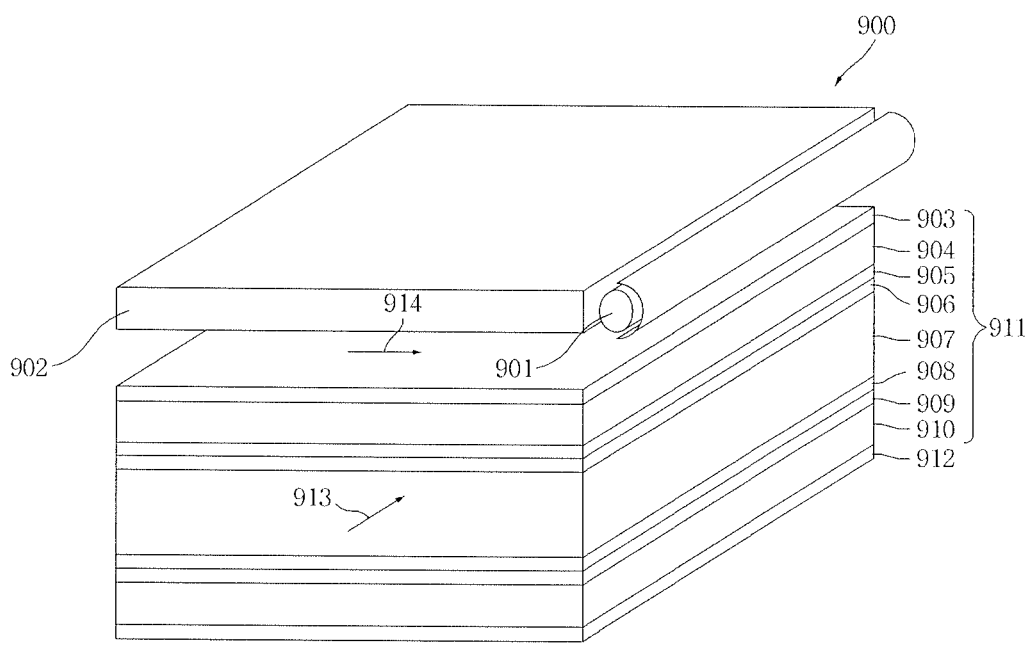
FIG. 9 is a cross-sectional perspective view illustrating the structure of a transmissive see-through display device according to a second embodiment.
Figure 10:
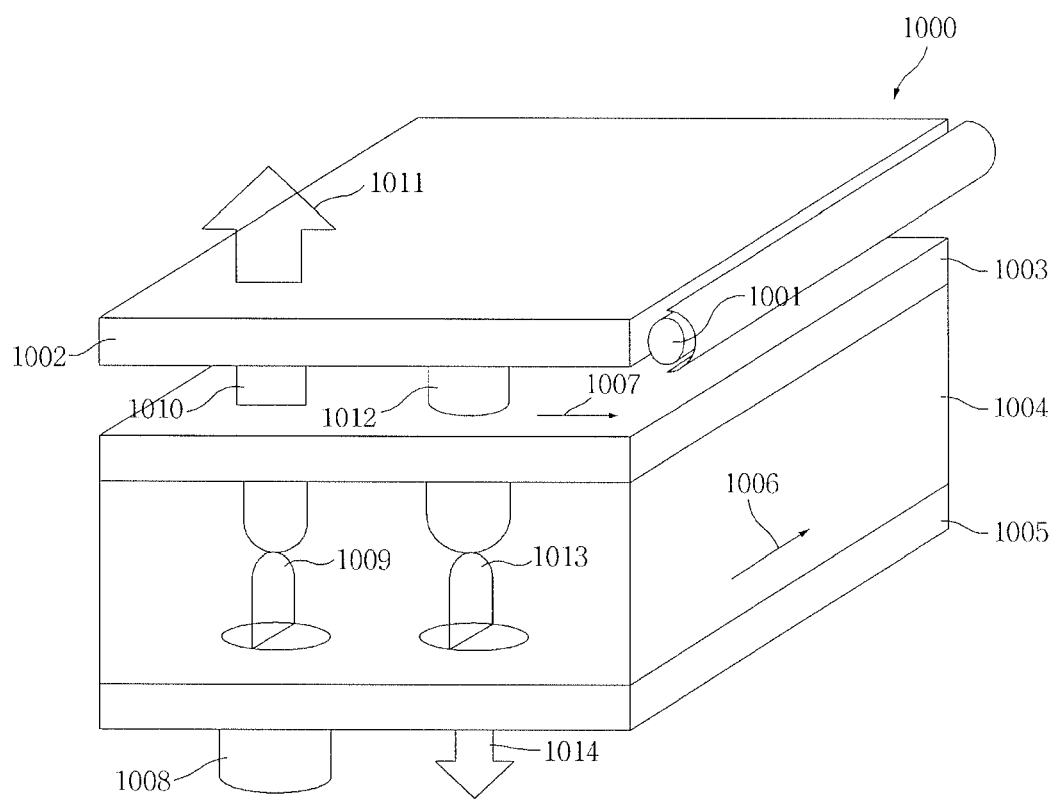
FIG. 10 is a view illustrating the operation when a see-through display device is in a transmitting state according to the second embodiment.
Figure 11:
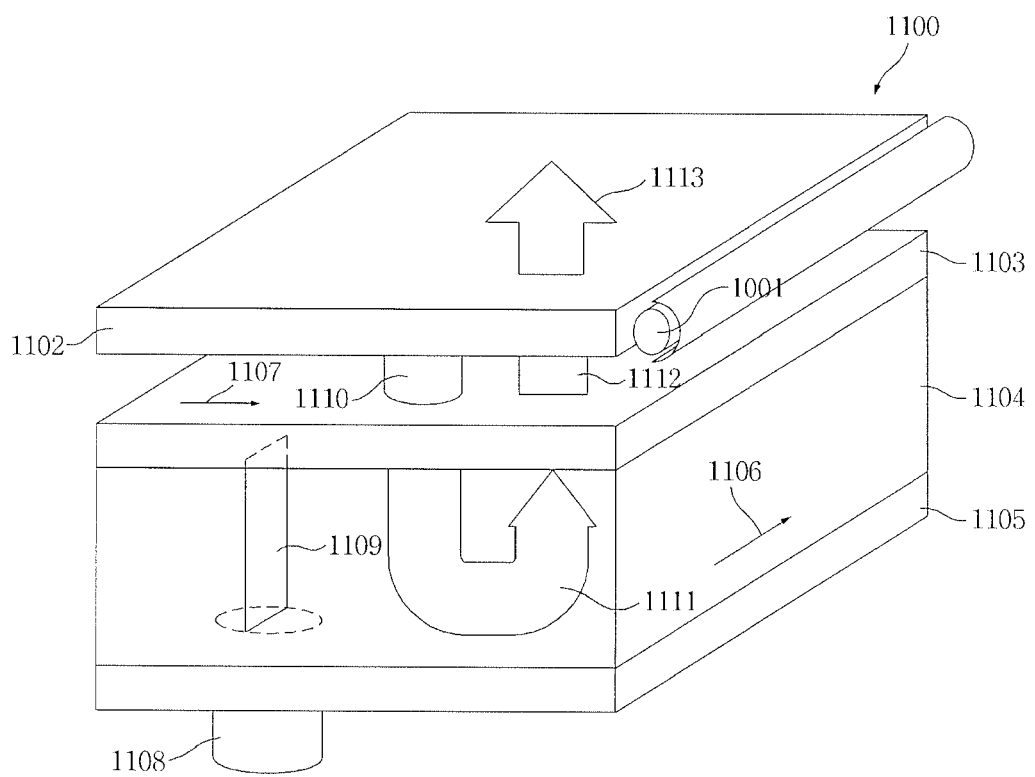
FIG. 11 is a view illustrating the operation when a see-through display device is in a blocking state according to the second embodiment.

FIG. 9 is a cross-sectional perspective view illustrating the structure of a transmissive see-through display device according to a second embodiment. FIG. 10 is a view illustrating an embodiment of the operation when a see-through display device is in a transmitting state. FIG. 11 is a view illustrating an embodiment of the operation when a see-through display device is in a blocking state.

FIG. 9 is a cross-sectional perspective view illustrating the structure of a transmissive see-through display device according to a second embodiment.

As illustrated in FIG. 9, the transmissive see-through display device 900 comprises a transparent optical display device 911.

The transparent optical display device 911 comprises a pair of first and second transparent plates 904 and 910, which are disposed while being spaced apart from each other at a predetermined distance.

Transparent conductive plates 905 and 909 are respectively positioned oil inner surfaces of the first and second transparent plates 904 and 910. The transparent first and second conductive plates 905 and 909 are used to apply a voltage to liquid crystals 907 interposed therebetween, and may be connected to a panel converting device (not shown) provided at the outside of the display device. For pixelation of the display device, each of the transparent first and second conductive plates 905 and 909 may comprise a thin addressable electrode matrix. Twist of the liquid crystals 907 interposed between the transparent first and second conductive plates 905 and 909 may be controlled by the panel converting device provided at the outside of the display device, thereby controlling brightness.

First and second orientation plates 906 and 908 are respectively positioned on inner surfaces of the transparent first and second conductive plates 905 and 909. The first and second orientation plates 906 and 908 determine an initial alignment state of the liquid crystals interposed therebetween. Accordingly, in the alignment state of the liquid crystals 907, an upper portion in contact with the first orientation plate 906 and a lower portion in contact with the second orientation plate 908 are aligned in directions of third and fourth arrows 914 and 913, respectively. The liquid crystals 907 may be the TN type display or the FSTN type display. In the TN type display, liquid crystal molecules are twisted by about 80 to 90 degrees when an electric field is not applied thereto. In the FSTN type display, liquid crystal molecules are twisted by about 180 to 270 degrees, and an optical compensation film is added to the STN type display.

A first polarizing plate 903 positioned on an upper surface of the transparent optical display device 911 polarizes unpolarized beams incident from the outside so as to pass only components of the beams parallel with the polarizing axis of the first polarizing plate 903 and to absorb components of the beams perpendicular to the polarizing axis of the first polarizing plate 903. A second polarizing plate 912 positioned on a lower surface of the transparent optical display device 911 polarizes unpolarized beams incident from the outside so as to pass only components of the beams parallel with the polarizing axis of the second polarizing plate 9712 and to reflect components of the beams perpendicular to the polarizing axis of the second polarizing plate 912. The polarizing axes of the first and second polarizing plates 903 and 912 are respectively arranged in directions of the third and fourth arrows 914 and 913 which are arranged perpendicular to each other.

A transparent light guide plate 902 is positioned above the first polarizing plate 903, and a light source 901 is positioned at one side of the light guide plate 902. Beams emitted from the light source 901 are incident to the light guide plate 902, refracted at an angle approximate to verticality by a plurality of patterns (not shown) formed on the light guide plate 902, and then incident to the transparent optical display device 911.

FIG. 10 is a view illustrating an embodiment of the operation when a see-through display device is in a transmitting state.

As illustrated in FIG. 10, when the display device 1000 is in a transmitting state, background beams 1008 incident from the rear of the display device 1000 are unpolarized beams. While the background beams 1008 are transmitted into a second polarizing plate 1005, only components of the background beams 1008 parallel with a polarizing axis 1006 are transmitted into the second polarizing plate 1005, and components of the background beams 1008 perpendicular to the polarizing axis 1006 are reflected by the second polarizing plate 1005. At this time, an electric field is not applied to liquid crystals 1004, and the liquid crystals 1004 are twisted by about 90 degrees in an initial alignment state. Accordingly, the polarizing direction of beams 1009 advancing inside the liquid crystals 1004 is changed into about 90 degrees. When the beams 1009 are transmitted into a first polarizing plate 1003, polarized components of the beams 1009 have the same direction as that of a polarizing axis 1007 of the first polarizing plate 1003. For this reason, the beams 1009 become beams 1010 which are transmitted into the first polarizing plate 1003 without absorption. The transmitted beams 1010 become beams 1011 which are incident to a transparent light guide plate 1002, transmitted into the light guide plate 1002 and then emitted to the front of the display device 1000.

Beams (not shown) emitted from a light source 1001 disposed at one side of the light guide plate 1002 become unpolarized beams 1012 which are incident to the light guide plate 1002, refracted at an angle approximate to verticality with respect to the light guide plate 1002 and then incident to the first polarizing plate 1003. While the beams 1012 are transmitted into the first polarizing plate 1003, only components of the beams 1012 parallel with the polarizing axis 1007 are transmitted into the first polarizing plate 1003, and components of the beams 1012 perpendicular to the polarizing axis 1007 are absorbed by the first polarizing plate 1003. The polarizing direction of beams 1013 advancing inside the liquid crystals 1004 is changed into about 90 degrees. When the beams 1013 are transmitted into the second polarizing plate 1005, polarized components of the beams 1013 have the same direction as that of the polarizing axis 1006 of the second polarizing plate 1005. For this reason, the beams 1013 become beams 1014 which are transmitted without reflection and then emitted to the front of the display device 1000. The beams 1014 emitted to the rear of the display device 1000 functions to illuminate background (not shown) positioned at the rear of the display device 1000, so that a user can continuously observe the background in time/space having a low luminance level.

FIG. 11 is a view illustrating an embodiment of the operation when a see-through display device is in a blocking state.

As illustrated in FIG. 11, when the display device 1100 is in a blocking state, background beams 1108 incident from the rear of the display device 1100 are unpolarized beams. While the background beams 1108 are transmitted into a second polarizing plate 1105, only components of the background beams 1108 parallel with a polarizing axis 1106 are transmitted into the second polarizing plate 1105, and components of the background beams 1108 perpendicular to the polarizing axis 1106 are reflected by the second polarizing plate 1105. At this time, an electric field is applied to liquid crystals 1104, and the liquid crystals 1104 are untwisted from the initial alignment state in which the liquid crystals 1104 are twisted by about 90 degrees. Accordingly, the polarizing direction of beams 1109 advancing inside the liquid crystals 1104 is maintained. When the beams 1109 are transmitted into a first polarizing plate 1103, polarized components of the beams 1109 ale perpendicular to a polarizing axis 1107 of the first polarizing plate 1103. For this reason, all the polarized components of the beams 1109 are absorbed by the first polarizing plate 1103, and there is no beam emitted to the front of the display device 1100.

Beams (not shown) emitted from a light source 1101 disposed at one side of a transparent light guide plate 1102 become unpolarized beams 1110 which are incident to the tight guide plate 1102, refracted at an angle approximate to verticality with respect to the light guide plate 1102 and then incident to the first polarizing plate 1103. While the beams 1110 are transmitted into the first polarizing plate 1103, only components of the beams 1110 parallel with the polarizing axis 1107 are transmitted into the first polarizing plate 1103, and components of the beams 1110 perpendicular to the polarizing axis 1107 are absorbed by the first polarizing plate 1103. The polarizing direction of beams 1111 advancing inside the liquid crystals 1104 is maintained. When the beams 1111 are transmitted into the second polarizing plate 1105, polarized components of the beams 1111 are perpendicular to the polarizing axis 1106 of the second polarizing plate 1105. For this reason, all the polarized components of the beams 1111 are reflected by the second polarizing plate 1105 and again incident to the first polarizing plate 1103. When the beams 1111 are incident to the first polarizing plate 1103, polarized components of the beams 1111 are parallel with the polarizing axis 1107 of the first polarizing plate 1103. For this reason, the beams 1111 become beams 1112 which are transmitted into the first polarizing plate 1103 without absorption.

The transmitted beams 1112 become beams 1113 which are incident to the light guide plate 1102, transmitted into the light guide plate 1102 and then emitted to the front of the display device 1100.

Meanwhile, it will be readily understood by those skilled in the art that a light source according to the first or second embodiment may be formed on at least one of sides of a light guide plate.

According to embodiments disclosed herein, a see-through display device comprises a transparent optical display device and a transparent light guide plate having a light source disposed at one side thereof, so that the display device can be optically transparent even when it is not operated.

Further, when it is difficult to clearly observe images expressed by an image display device due to the low luminance level, the images can be recognized using the light source.

Furthermore, when a light source is operated, background positioned at the rear of the display device is still transmitted to the front of the display device, so that the display device can be installed in a transparent glass or plastic window such as a show window or a normal window, and the display device can be optically transparent regardless of day/night or activation/non-activation of the display device.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A see-through, display device comprising:
   a liquid crystal plate filled with liquid crystals;
   first and second orientation plates respectively positioned on upper and lower surfaces of the liquid crystal plate, and controlling an initial alignment state of the liquid crystals;
   first and second conductive plates respectively positioned on an upper surface of the first orientation plate and a lower surface of the second orientation plate, and being filled with a conductive material;
   first and second transparent plates respectively positioned on an upper surface of the first conductive plate and a lower surface of the second conductive plate;
   first and second polarizing plates respectively positioned on an upper surface of the first transparent plate and a lower surface of the second transparent plate;
   a transparent light guide plate spaced apart from a lower surface of the second polarizing plate; and
   a light source positioned adjacent a side edge of the transparent light guide plate;
   the transparent light guide plate allowing beams generated by the light source incident from the side edge to be totally reflected and emitted upward; and
   the see-through display device being optically transparent so that a background at a rear of the see-through display device can be observed from a front of the see-through display device.

2. A see-through display device comprising:
   a liquid crystal plate filled with liquid crystals;

first and second orientation plates respectively positioned on upper and lower surfaces of the liquid crystal plate, and controlling an initial alignment state of the liquid crystals;

first and second conductive plates respectively positioned on an upper surface of the first orientation plate and a lower surface of the second orientation plate, and being filled with a conductive material;

first and second transparent plates respectively positioned on an upper surface of the first conductive plate and a lower surface of the second conductive plate;

first and second polarizing plates respectively positioned on an upper surface of the first transparent plate and a lower surface of the second transparent plate;

a transparent light, guide plate spaced apart from an upper surface of the first polarizing plate; and a light source positioned adjacent a side edge of the transparent light guide plate;

the transparent guide plate allowing beams generated by the light source incident from the side edge to be totally reflected and emitted downward; and the see-through display device being optically transparent so that a background at a rear of the see-through display device can be observed from a front of the see-through display device.

3. The see-through display device according to claim 1, wherein a polarizing axis of the first polarizing plate is formed perpendicular to that of the second polarizing plate.

4. The see-through display device according to claim 1 or 2, wherein the first and second polarizing plates are dichroic polarizing plates including iodine or pigmentation-oriented polyvinyl alcohol.

5. The see-through display device according to claim 1 or 2, wherein the first and second transparent plates are made of glass or plastic.

6. The see-through display device according to claim 1 or 2, wherein the liquid crystal plate is a twisted nematic (TN) type display in which liquid crystal molecules are twisted by about 80 to 90 degrees, or a film compensated super twisted nematic (FSTN) type display in which liquid crystal molecules are twisted by about 180 to 270 degrees and an optical compensation film is added to the film compensated super twisted nematic (FSTN).

7. The see-through display device according to claim 1 or 2, wherein each the first and second conductive plates comprises a thin addressable electrode matrix.

8. The see-through display device according to claim 1, wherein the light guide plate comprises a light path changing means allowing beams incident from the side edge of the light guide plate to be refracted and advanced toward the second polarizing plate.

9. The see-through display device according to claim 8, wherein the light path changing means comprises a plurality of patterns formed on an upper or lower surface of the light guide plate so that beams are refracted and then emitted toward the second polarizing plate.

10. The see-through display device according to claim 9, wherein the plurality of patterns are sparsely spaced apart from one another to minimize refraction of beams which are incident to the lower surface of the light guide plate, transmitted into the light guide plate and then emitted to the upper surface of the light guide plate.

11. The see-through display device according to claim 1 or 2 wherein the light guide plate is formed of a transparent optical material including at least one of polymethyl methacrylate (PMMA), polycarbonate (PC) and polydimethylsiloxane (PDMS).

12. The see-through display device according to claim 1 or 2 wherein the light source is a combination of a cold cathode fluorescent lamp (CCFL) and a reflective body, or a light emitting diode (LED).

13. The see-through display device according, to claim 2, wherein a polarizing axis of the first polarizing plate is formed parallel with a polarizing axis of the second polarizing plate.

14. The see-through display device according to claim 2, wherein the second polarizing plate allows beams having a polarizing state perpendicular to a stretch direction thereof to be transmitted and allows beams having a polarizing state parallel with the stretch direction thereof to be reflected.

15. The see-through display device according to claim 2, wherein the light guide plate comprises a light path changing means allowing beams incident from the side edge of the light guide plate to be refracted and advanced toward the first polarizing plate.

16. The see-through display device according to claim 1, wherein the see-through display device is optically transparent in an off state.

17. The see-through display device according, to claim 1, wherein the see-through display device is optically transparent in both an operating state and an off state.

18. The see-through display device according to claim 2, wherein the see-through display device is optically transparent in an off state.

19. The see-through display device according to claim 2, wherein the see-through display device is optically transparent in both an operating state and an of state.

20. The see-through display device according to claim 15, wherein the light, path changing means comprises a plurality of patterns formed on an upper or lower surface of the light guide plate so that beams are refracted and then emitted toward the first polarizing plate.

21. The see-through display device according to claim 20, wherein the plurality of patterns are sparsely spaced apart from one another to minimize refraction of beams which are incident to the upper surface of the light guide plate, transmitted into the light guide plate and then emitted to the lower surface of the light guide plate.

* * * * *